United States Patent
Thompson

(10) Patent No.: US 9,924,580 B2
(45) Date of Patent: Mar. 20, 2018

(54) LIGHT SWITCH

(71) Applicant: Echostar UK Holdings Limited, Keighly, West Yorkshire (GB)

(72) Inventor: Geoffrey Thompson, Keighley (GB)

(73) Assignee: ECHOSTAR TECHNOLOGIES INTERNATIONAL CORPORATION, Englewood, CO (US)

( * ) Notice: Subject to any disclaimer, the term of this patent is extended or adjusted under 35 U.S.C. 154(b) by 0 days.

(21) Appl. No.: 15/351,146

(22) Filed: Nov. 14, 2016

(65) Prior Publication Data
US 2017/0064797 A1 Mar. 2, 2017

Related U.S. Application Data

(63) Continuation of application No. 14/982,333, filed on Dec. 29, 2015, now Pat. No. 9,526,154.

(30) Foreign Application Priority Data

Feb. 26, 2015 (EP) ..................................... 15156798

(51) Int. Cl.
*H05B 37/02* (2006.01)
*H01H 9/02* (2006.01)
(Continued)

(52) U.S. Cl.
CPC ....... *H05B 37/0272* (2013.01); *H01H 9/0271* (2013.01); *H01H 9/161* (2013.01); *H01H 9/20* (2013.01); *H01H 9/54* (2013.01)

(58) Field of Classification Search
CPC ............ H05B 33/0815; H05B 33/0818; H05B 33/0884; H05B 33/0809; H05B 33/0848;
(Continued)

(56) References Cited

U.S. PATENT DOCUMENTS 5,397,869 A 3/1995 Huen
6,771,182 B1 8/2004 Loh et al.
(Continued)

FOREIGN PATENT DOCUMENTS

AU 2010101028 A4 10/2010
GB 2478139 A 8/2011

OTHER PUBLICATIONS

European Search Report for EP15156798 dated Aug. 26, 2015, all pages.
(Continued)

*Primary Examiner* — Douglas W Owens
*Assistant Examiner* — Syed M Kaiser
(74) *Attorney, Agent, or Firm* — Kilpatrick Townsend & Stockton LLP

(57) ABSTRACT

A light switch comprises a user input mechanism, a wireless receiver for receiving remote control signals and a processor coupled to the user input mechanism and to the wireless receiver and configured to control a light source to turn it on and off both in response to activation of the user input mechanism and in response to the remote control signals. The light switch is configured, in response to a user override input via the user input mechanism, to enter an override state, whereby the light source is maintained in an off state and remote control signals are prevented from causing the light source to be switched on, until the override state is disengaged. An additional light switch may also be provided that communicates with the aforementioned light switch to provide multi-way switching.

20 Claims, 10 Drawing Sheets

(51) Int. Cl.
*H01H 9/16* (2006.01)
*H01H 9/20* (2006.01)
*H01H 9/54* (2006.01)

(58) Field of Classification Search
CPC .............. H05B 33/0896; H05B 37/029; H05B 37/0245; H05B 37/0254; H05B 37/0272
USPC .................................. 315/291, 209, 226, 360
See application file for complete search history.

(56) References Cited

U.S. PATENT DOCUMENTS

| | | | |
|---|---|---|---|
| 9,526,154 B2* | 12/2016 | Thompson | H01H 9/0271 |
| 2005/0111022 A1* | 5/2005 | Farrell | G06K 15/005 |
| | | | 358/1.13 |
| 2005/0253538 A1 | 11/2005 | Shah et al. | |
| 2008/0074059 A1* | 3/2008 | Ahmed | H05B 37/0218 |
| | | | 315/291 |
| 2009/0010494 A1* | 1/2009 | Bechtel | B60Q 1/1423 |
| | | | 382/104 |
| 2010/0277306 A1* | 11/2010 | Leinen | G08C 17/00 |
| | | | 340/539.3 |
| 2011/0199008 A1* | 8/2011 | Trattler | G05F 1/575 |
| | | | 315/185 R |
| 2012/0116632 A1* | 5/2012 | Bechtel | B60Q 1/1423 |
| | | | 701/36 |
| 2012/0223661 A1* | 9/2012 | Bloch | H05B 37/0281 |
| | | | 315/360 |
| 2014/0166447 A1* | 6/2014 | Thea | H01H 43/02 |
| | | | 200/19.01 |

OTHER PUBLICATIONS

Author Unknown, "belkin WeMo® Switch" Belkin electronics, accessed on Jan. 20, 2016, 5 pages. Retrieved from http://www.belkin.com/us/p/P-F7C027.
U.S. Appl. No. 14/982,333, filed Dec. 29, 2015, Non-Final Rejection dated May 27, 2016, all pages.
U.S. Appl. No. 14/982,333, filed Dec. 29, 2015, Notice of Allowance dated Aug. 12, 2016, all pages.

* cited by examiner

LIGHT SWITCH

CROSS-REFERENCE TO RELATED APPLICATION

This application is a continuation of U.S. application Ser. No. 14/982,333, filed Dec. 29, 2015, which claims priority to European Patent Application No. 15156798, filed Feb. 26, 2015, the disclosures of which are incorporated by reference herein in their entireties.

TECHNICAL FIELD

Embodiments of the invention relate to a light switch for both manually and remotely controlling one or more light sources, such as light bulbs.

BACKGROUND OF THE INVENTION

Systems for remotely controlling lighting, for example in the home or office environment, have been gaining popularity as automation systems have developed. Known systems to provide remote control of lighting are, however, inconvenient for a number of reasons.

Systems such as the WeMo® Switch provided by Belkin™ provide a remote controllable switch that plugs into a wall socket. Appliances, such as a lamp, can then be plugged into the switch to provide remote control over the appliance via WiFi. However, such systems cannot be used with mains wired lighting systems, and require a bulky socket mountable wireless switch.

Other systems provide the remote control components within the light source. For example, UK patent GB 2478139 describes a system in which a wireless dimmer device is incorporated into a light-emitting component, such that a remote control can be used to implement wireless remote control of the dimmer device. This requires more complicated and expensive light sources, and limits the user's choice on suitable lighting.

It is also known to provide remote control units that can be used to control mains wired light sources in addition to a light switch. An issue with such systems is that both the remote control unit and a physical light switch can be used to instruct a controller to turn the light source on or off. This can lead to confusion of the user, since the light switch will not have a definitive "on" or "off" setting when used in conjunction with the remote control. In this circumstance it is normal for the physical light switch to have no defined on or off position, such as the two way manual switch of the sort shown in FIG. 1, which is biased to a centre position. Pressing the switch actuator one way (conventionally in the downward direction for wall mounted switches) turns the light on; pressing the actuator in the other direction turns the light off. Whenever the switch is pressed it returns to a centre biased position so that if the user, in parallel, turns the lights on or off with a remote device, they are not confused by the mechanical state of the physical switch. The user then knows which way to press the switch to turn the light source on or off, even when the light source has been activated or deactivated remotely in between using the manual switch.

Such systems present a safety issue, however. If the user needs to change a light bulb, because the bulb has failed or is otherwise defective, there is no way to be certain that the electric supply to the light is definitely off. The user will not know for certain whether power is being supplied to the light fitting or not without turning the power off at the main fuse or relay box for the building. Even if the user turns the light off by a remote application there is still the chance that another user may enable it remotely, or that there may be some form of system timer or event that may try to turn the switch on.

What is needed is an easily installed and safer remote control system for mains wired lighting controllable both by a remote control mechanism and a manual switch.

SUMMARY OF THE INVENTION

The invention is defined in the independent claims to which reference is now directed. Preferred features are set out in the dependent claims.

Embodiments of the invention provide a wall mounted light switch that can be used in a remote controlled lighting system. Generally, a user input mechanism, such as a switch mechanism, is used to control a light source that is also controllable using remote control signals. The switch mechanism can be used to put the light source into an override state, whereby the light source is maintained in an off state, and cannot be activated by remote control signal. When the light source is in the override state, as opposed to the "off" or "on" states, the light switch includes an indicator that identifies this to the user.

According to a first aspect, a light switch is provided comprising a user input, or switch mechanism, a wireless receiver for receiving remote control signals, and a processor coupled to the switch mechanism and to the wireless receiver and configured to control a light source both in response to activation of the switch mechanism and in response to the remote control signals. The light switch is configured, in response to a user override input via the switch mechanism, to enter an override state, whereby the light source is maintained in an off state and remote control signals are prevented from causing the light source to be switched on.

Embodiments may include a physical switch having an additional position which may be selected by pushing the switch beyond its normal limit of operation. This override position preferably requires an additional degree of force to be selected and may use a form of detent or latching mechanism. In this position it is visually and tactilely clear to the user that power is removed from the device and the switch will no longer respond to remote commands.

The override switch may be either a fully mechanical switch or may make use of an electronic control mechanism. The same light switch may also include all the circuitry and components required for the remote control switching application, including a remote control receiver, such as an RF receiver, and control circuitry. By incorporating the physical switches and the control circuitry into a single unit, a mechanism is provided to upgrade homes in situations where the businesses and householders may already be used to changing such components for cosmetic reasons.

Some electronic light switches dispense with a mechanical switch and use a switching arrangement with separate on/off or up/down buttons, which may be electromechanical or touch sensitive for example. The same problem arises however. In this case the processor may be configured to recognize the user override input as a series of predefined inputs using the switch mechanism. An override position may be enabled by some combination of the electronic switches, or a separate electronic switch on the light switch, being pressed. For example, both buttons may be pressed together for a length of time, or one button may be pressed for a longer than normal length of time, which disables the circuit and enables a visual indication. An indication, such as a visual indication, for example in the form of an LED, may then be given. To re-enable the circuit the same or an alternate input may be required to prevent accidental re-activation.

An advantage of embodiments according to the first aspect is that they require only a single component to be changed to provide wireless lighting control, whereas prior systems require either a switch and an RF enabled lamp, or a switch and an additional controller module which would typically be located near the light. This provides a cost saving and also means that the device works with any light fittings and bulbs, which allows the user a greater choice of components for their lighting.

Embodiments may apply to multiple gang versions of switches.

Preferably the components of the light switch are powered by the mains supply, but embodiments may employ self-powered and/or power storage functionality when operating from only a live supply connection.

In some scenarios the light switch may be a secondary switch that does not include a processor configured to control the light source and to receive wireless commands. According to a second aspect, therefore, a light switch comprises a switch mechanism, a communication output, and a processor coupled to the switch mechanism and to the communication output. The processor is configured to receive input from a user by activation of the switch mechanism, and to send data indicative of the input from the user to a remotely located controller that controls a light source both in response to activation of the switch mechanism and in response to remote control signals received via a wireless receiver. The light switch is configured, in response to user input via the switch mechanism, to trigger an override state whereby the light source is maintained in an off state and remote control signals are prevented from causing the light source to be switched on.

A relay switch may be provided as part of the switch of the second aspect, coupled to the live wire of the light source, wherein the override state is triggered by actuating the relay, via the processor or directly by the switch mechanism, to prevent electrical power reaching the light source. Alternatively, the override state may be triggered by the processor sending an override signal to the controller indicating that an override state has been selected by the user, the controller being configured, in response to receiving the override signal, to maintain the light source in an off state and prevent remote control signals from causing the light source to be switched on.

The remotely located controller may be part of a dedicated control unit. Alternatively, the remotely located controller may be a processor of the light switch according to the first aspect. This allows an extension to the first aspect to a switch for use in circumstances where a lighting circuit is controlled from two locations. In this case SPDT switches are conventionally used, but with the problem that the switch position cannot be used to determine if the light is on or off.

According to a third aspect of the invention a switch, or switch mechanism, is provided for use in any of the light switches described herein. The light switch comprises an actuator having at least a first activation position, a second activation position and an override position, and the switch further comprises a detent mechanism that holds the actuator in the override position until an external force is applied to the actuator.

Optionally, the actuator is biased to a first biased position and the override position is engaged by applying a force to the actuator against the bias until the detent mechanism engages.

The actuator is optionally moveable between the first biased position and the first activation position by applying a force against the bias, said force being less than the force required to engage the detent mechanism, the actuator moving back to the first biased position from the first activation position when the force is removed, wherein, in use, when the actuator is placed in the first activation position, a signal is sent to control a light source. The actuator may optionally be moveable between the first biased position and a second activation position by applying a force against the bias, the actuator moving back to the first biased position from the second activation position when the force is removed, wherein, in use, when the actuator is placed in the second activation position, a signal is sent to the processor to control a light source.

Optionally, when the actuator is in the first activation position, the switch sends a signal to control the light source to turn on, and when the actuator is in the second activation position the switch sends a signal to control the light source to turn off.

DETAILED DESCRIPTION OF THE INVENTION

Figure 1:
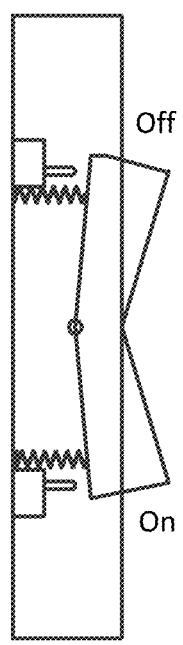
FIG. 1 is an example of a known switch type.
Figure 2A:
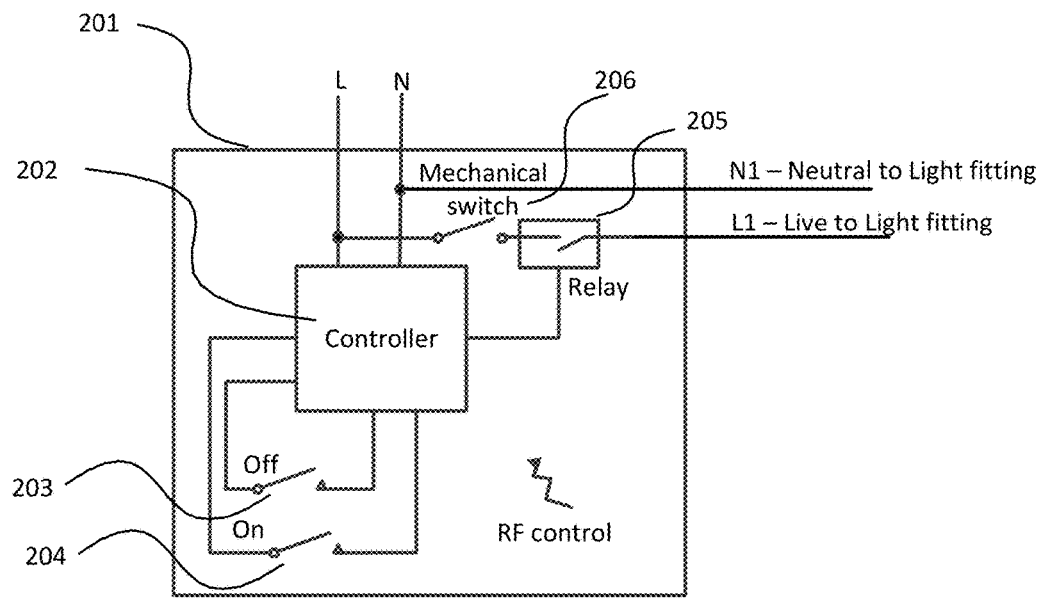
FIG. 2A is a schematic example of a light switch according to a first embodiment of the invention.

FIG. 2A shows an example of a light switch 201 according to a first embodiment of the invention. The light switch 201 has a housing that contains a controller 202, which may be embodied as an appropriately programmed microprocessor. A wireless command receiver is provided as part of, or coupled to, the controller.

The wireless command receiver may take the form of any appropriate wireless receiver, such as an RF receiver device, Bluetooth device, infra-red device, WiFi device, Zigbee device and so on.

The light switch 201 may be mounted on a wall of a home or office. A user controls one or more associated lights that are coupled to the light switch by closing the manual switches 203 and 204. Upon activating the manual switches, by applying a force to a switch actuator, the controller detects the user input and controls the light source accordingly by controlling a relay or electronic switch device 205. For example, pressing the "Off" switch may instruct the controller to turn the light off, and pressing the "On" switch may instruct the controller to turn the light on.

In addition, the controller receives wireless commands from a remote control unit (not shown). The wireless commands, after receipt, may be decoded and are then passed to the controller, which is programmed to respond to the command by taking appropriate action. For example, the command may instruct the controller to turn the light on or off, which it does by controlling relay 205 as mentioned above.

In addition, a further mechanical switch 206 is provided. This switch provides an override, or bypass, that ensures that the light to which the switch 201 is coupled is in an "off" state, whereby current is not passing to the light source, and the controller cannot turn the light on in response to received wireless controls. The mechanical override switch 206 prevents current flowing through the light by breaking the circuit, thus providing a physical override to control by the controller 202.

In the example of FIG. 2A, the wiring shown includes live (L) and neutral (N) wires passing through the light switch 201 and on to the light or light fitting. This is an older wiring arrangement used in some locations, such as the UK.

Figure 2B:
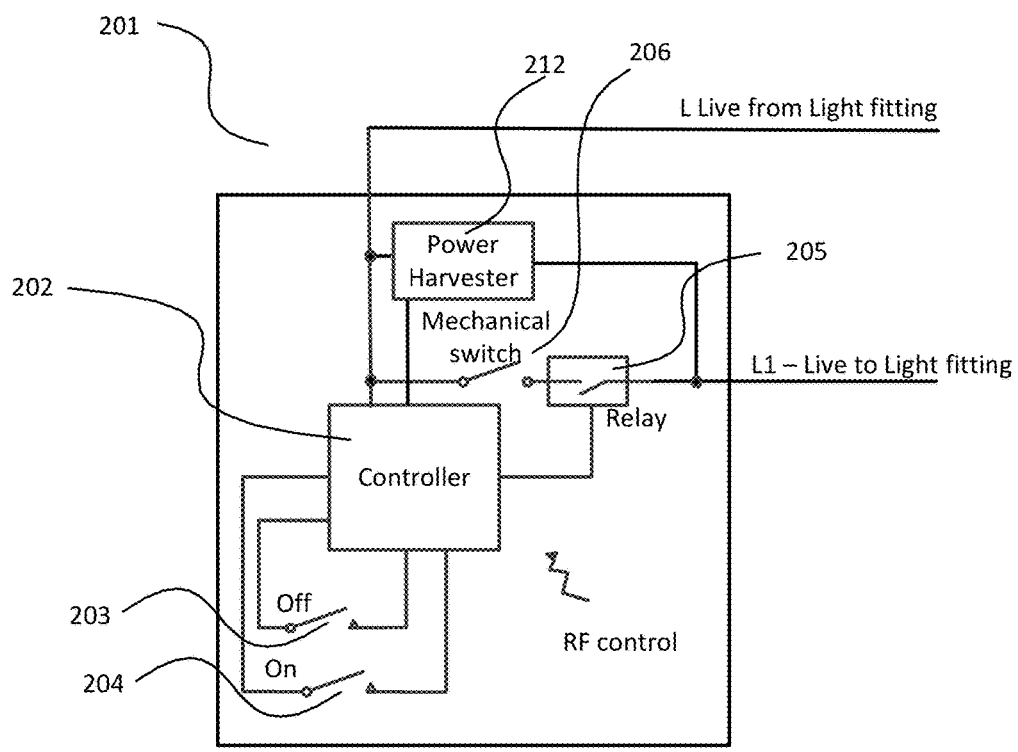
FIG. 2B is a schematic example of the light switch of FIG. 2A, wired for an alternative mains wiring configuration.

FIG. 2B shows an alternative example, in which like features are numbered with corresponding references to those of FIG. 2A. This example uses the more modern loop in wiring arrangement, in which only the live wire passes through the light switch 201.

Although the wiring arrangement of FIG. 2B may be more convenient for wiring a property with multiple light sources, it makes implementing a wireless switch system more difficult. The components of the switch require power, so that the controller can receive instructions from the wireless receiver and input from the physical switch components. In the example of FIG. 2A it is convenient to use the mains power as a permanent power source for the switch components, which is possible because the live and neutral wires pass through the light switch. Therefore, permanent power can be provided to the controller 202 by connecting the live and neutral wires, with appropriate power conversion as necessary. In the example of FIG. 2B, a permanent power connection is not possible because only the live wire is available at the light switch. In such examples, some form of power harvesting may optionally be used so that power is available when the live wire is not carrying current to the light, as described in more detail below.

FIG. 3 shows an example of a switch mechanism that may be used with the light switch of FIGS. 2A and 2B, or any other embodiments described herein. The switch 301 includes an actuator 302 that can be used to engage switch sub-components 303 and 304 when the actuator contacts them with sufficient force. The switch sub-components 303 and 304 are themselves electromechanical switches, and when the actuator contacts them with sufficient force they change states, causing a signal to the controller 202 indicative of this. As such, these sub-components can be used to send input to the controller 202 to indicate that the light should be switched on or off. In this example the sub-components 303 and 304 are "normally open" (no) switches, whereby contact from the switch actuator closes the switch. The switches may, for example, be activated by pressure, or by movement of a second actuator.

The switch actuator may be any suitable actuator for allowing a user to interact with the switch mechanism to provide input to the controller 202. In the example of FIG. 3, the switch actuator is a pivoted or rocker switch.

The switch actuator is biased by resilient means such as one or more resilient members 310. The resilient members cause the switch actuator to revert to a stable position in which the sub-component switches are not activated. This may be a central position achieved by placing resilient members either side of the pivot point of the actuator, preferably equidistant relative to the pivot point. The resilient members 310 may be springs for example.

In addition to sub-component switches 303 and 304 for controlling operation of the light coupled to the light switch 201, an additional bypass or override switch 306 is included. The override switch 306 is integrated within the switch mechanism 301 used to provide regular control of the light, such as on/off control. The override switch is engaged by moving the switch further along its predefined movement path than the amount required to engage switch 303. This requires pressing the switch actuator 302 against the resilient member 310 with a force greater than that required to activate switch 303. When the actuator contacts or engages the override switch 306 with sufficient force it changes states. In this embodiment the override switch is a mechanical switch 306 of the "normally closed" (nc) type. Contact from the switch actuator causes the switch to open. The switch may, for example, be activated by pressure, or by movement of a second actuator.

In order to maintain the override switch in position, a detent mechanism 307 is provided that engages when the switch actuator activates the override switch. The detent mechanism can be disengaged by applying a sufficient force to move the switch actuator in the opposite direction of that required to engage the override switch. Various mechanical arrangements can be used for the detent mechanism, such as a latching mechanism for example.

Figure 3D:
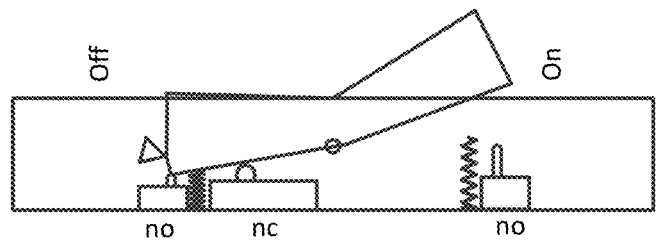
FIGS. 3A to 3D are an example of a switch mechanism for use with embodiments of the invention.
Figure 3C:
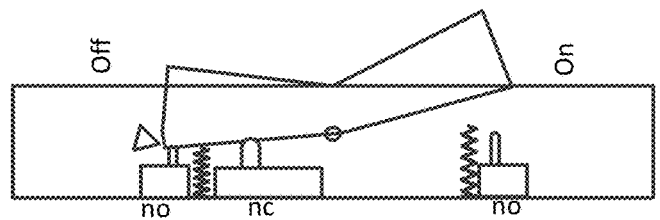
Figure 3B:
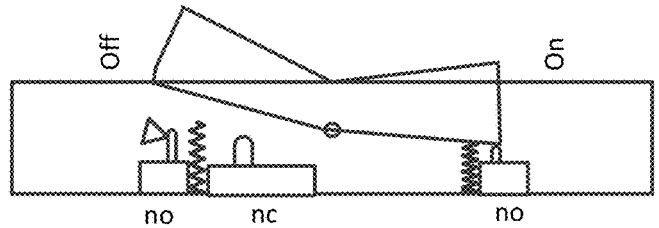
Figure 3A:
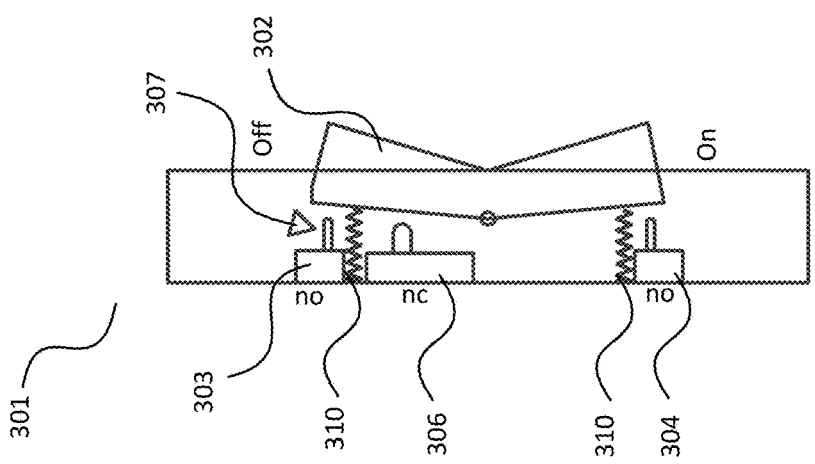

In FIG. 3A the switch mechanism 301 is shown in its normal biased inactive position. In this example this is a stable centre position in which none of the switch sub-components are activated.

In FIG. 3B, the switch has been momentarily pressed downwards, against the biasing, engaging sub-component switch 304 and resulting in an "on" command being sent by the controller 202 by closing switch 204/304 momentarily.

In FIG. 3C, the switch has been momentarily pressed upwards, against the biasing, engaging sub-component switch 303 and resulting in an "off" command being sent by the controller 202 by closing switch 203/303 momentarily.

In FIG. 3D, the switch has been permanently pressed upwards, with the mechanical detent mechanism holding the switch in place. This provides an override to the local controller, by opening switch 206/306, which turns power permanently off to the light and prevents remote commands from any other source activating the light as long as the switch is held in place by the detent mechanism. The detent mechanism provides a visual and tactile indication to the user that the switch is in the override position.

Figure 4A:
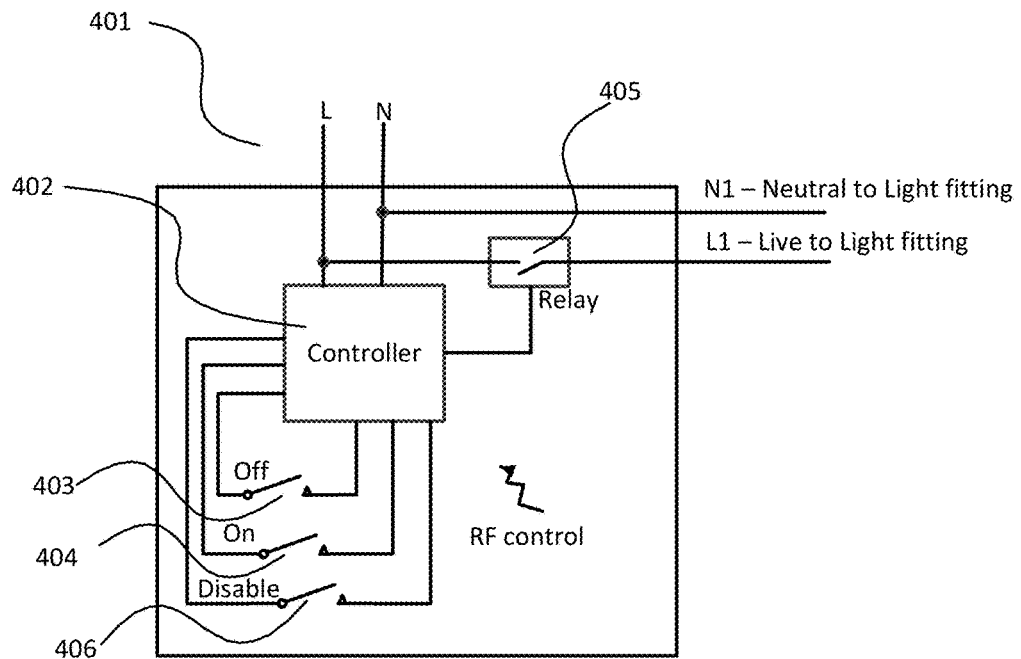
FIG. 4A is a schematic example of a light switch according to a second embodiment of the invention.

FIG. 4A shows an example of a light switch according to a second embodiment of the invention. This embodiment differs from the previous embodiment in that the override functionality is provided electronically by a relay, rather than by a manual switch.

Figure 4B:
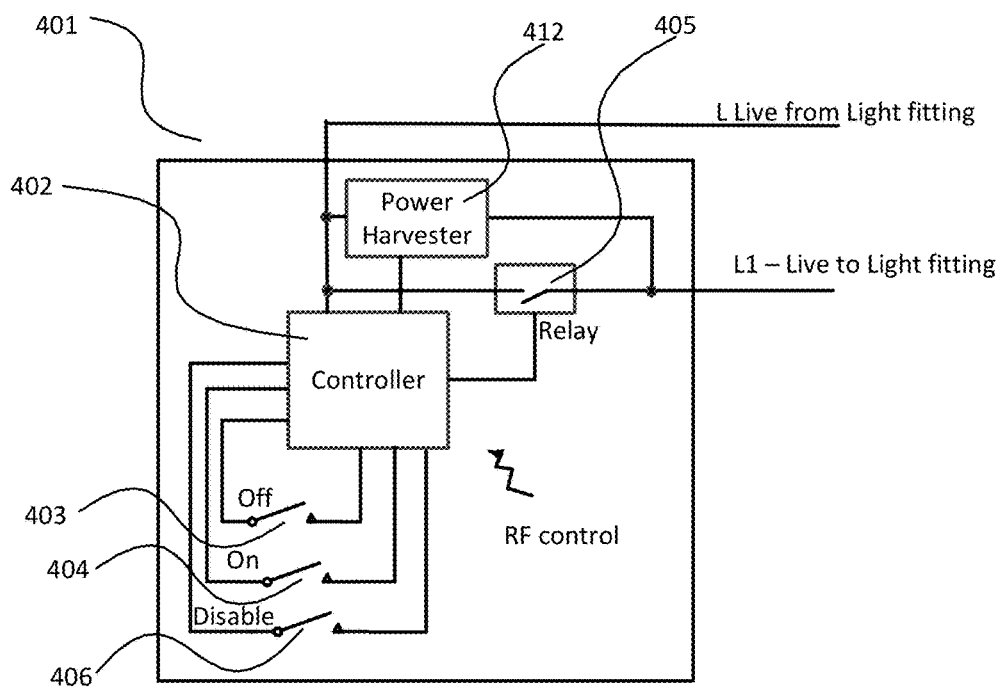
FIG. 4B is a schematic example of the light switch of FIG. 4A, wired for an alternative mains wiring configuration.

FIG. 4B shows an alternative example, as with FIG. 2B, that uses the more modern radial wiring arrangement, in which only the live wire passes through the light switch 401, again with optional power harvesting functionality, which will be described below in more detail.

The controller of FIG. 4A is programmed to receive an indication from the user that an override position is desired. This may be provided by a separate override switch 406 that is shown connected directly to the controller, or by the detection of a continually closed "off" switch 403. In the embodiments of FIGS. 4A and 4B the activation of the override requires the controller to be programmed both to control the relay 405 to prevent current passing to the light, and to ignore remote commands to switch the light on.

As a first example, a switch arrangement similar to that of FIG. 3 could be used, but rather than using a "normally closed" sub-component override switch 306 to operate a physical switch to prevent power reaching the light, an appropriate switch 406, which may be a "normally open" switch, can be used to provide input to the controller 402. The switch can be connected to the controller 402 in the same manner as the "off" and "on" switches shown in FIG. 4A. The controller is programmed to maintain relay 405 open as long as the sub-component override switch is activated. Again, a detent mechanism may be used to hold the switch actuator in place for the desired duration.

As a second example, one of the manual switches 403 and 404 is used to provide input to the controller to indicate that the override functionality is to be engaged. Override is achieved by providing a detent mechanism, of the sort described in relation to FIG. 3, whereby the switch actuator is held in a position that activates one of the manual sub-component switches. When the detent mechanism is activated the switch 403 is held in its activated state, which is closed in this example. Preferably the manual sub-component switch that is used to switch the light off (switch 403 in this example) is engaged by the detent mechanism, as it is most logical to activate the override by pressing the light switch in the off direction.

The controller 402 is programmed to activate the override mode, opening relay 405, when it receives a signal caused by the permanent activation of switch 403. In particular, this can be achieved by latching the manual switch as appropriate and programming the controller to ignore instructions received via the wireless receiver to activate the light when switch 403 is permanently activated. The override mode is deactivated when the detent mechanism is disengaged and the switch is allowed to deactivate, by opening in this example.

Optionally the override mode may only be activated when the switch 403 has been activated for a predetermined period of time, such as a period of several seconds. Alternatively, or in addition, deactivation of the override mode may only occur after the detent mechanism has been deactivated, and thus the switch 403 has been deactivated, for a predetermined period of time, such as a period of several seconds. Optionally the delays may be applied only to the controller's functionality to ignore wireless commands. The controller may operate the relay to turn the light off upon receiving the signal from the switch 403, but wait for the predetermined time before ignoring signals from the wireless receiver. Additionally, or alternatively, the controller may continue to ignore signals from the wireless receiver, at least to activate the light, for the predetermined time after the detent mechanism has been deactivated.

FIG. 5 shows a switch mechanism according to the second example, which may be used with the light switch of FIGS. 4A and 4B. The switch shares many features in common with the switch of FIG. 3. The switch 501 includes an actuator 502 that can be used to engage switch sub-components 503 and 504 when the actuator is pushed against them by a force. The switch sub-components 503 and 504 are themselves electromechanical switches, and when the actuator contacts them with sufficient force they change states, sending a signal to the controller 402 indicative of this. As such, these sub-components can be used to send input to the controller 402 to indicate that the light should be switched on or off. In this example the sub-components 503 and 504 are "normally open" switches, whereby contact from the switch actuator closes the switch. The switches may, for example, be activated by pressure, or by movement of a second actuator.

As with the switch of FIG. 3, the switch actuator of FIG. 5 may be any suitable actuator for allowing a user to interact with the switch mechanism to provide input to the controller 502. In the example of FIG. 5, the switch actuator is a pivoted or rocker switch.

The switch actuator of FIG. 5 is biased in the same manner as with the switch of FIG. 3 using resilient means such as one or more resilient members 510. The override functionality is still integrated within the switch mechanism 501 used to provide regular control of the light, such as on/off control, but rather than using a specific override switch, switch 503 is used. The override functionality is engaged by moving the switch actuator against the resilient member 510, with a force greater than that required to activate switch 503 during normal use, until a detent mechanism is engaged, the detent mechanism being the same as that described for FIG. 3.

Figure 5D:
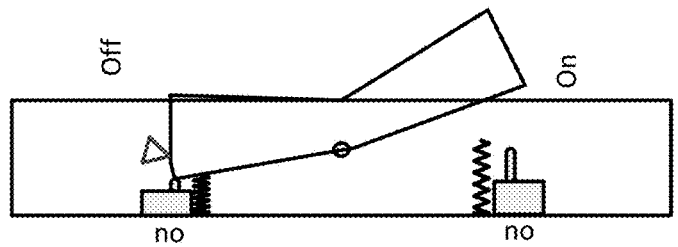
FIGS. 5A to 5D show an example of a switch mechanism for use with embodiments of the invention.
Figure 5C:
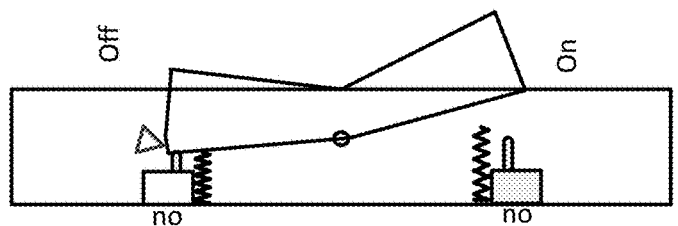
Figure 5B:
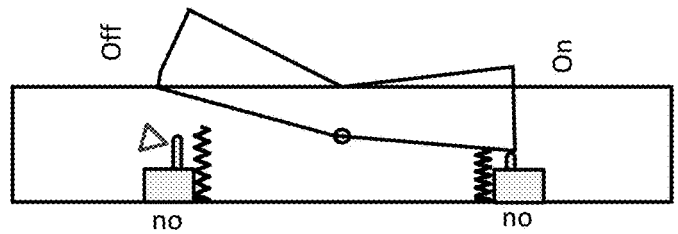
Figure 5A:
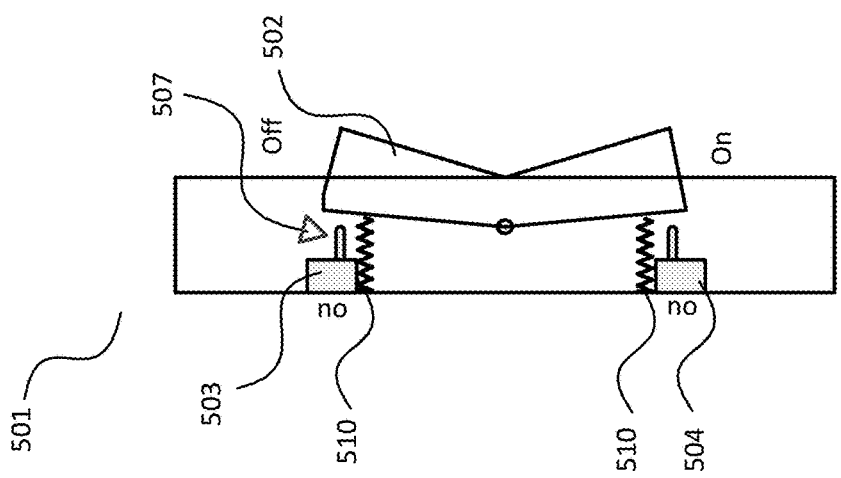

In FIG. 5A the switch mechanism 501 is shown in its normal biased inactive position. In this example this is a stable centre position in which none of the switch sub-components are activated.

In FIG. 5B, the switch has been momentarily pressed downwards, against the biasing, engaging sub-component switch 404/504 and resulting in an "on" command being sent by the controller 402 by closing switch 404/504 momentarily.

In FIG. 5C, the switch has been momentarily pressed upwards, against the biasing, engaging sub-component switch 403/503 and resulting in an "off" command being sent by the controller 402 by closing switch 403/503 momentarily.

In FIG. 5D, the switch has been permanently pressed upwards, with the mechanical detent mechanism holding the switch in place. This provides an override signal to the controller, by permanently closing switch 403/503, which controls the relay 405 to turn power permanently off to the light and prevents remote commands from any other source activating the light until the override is deactivated.

Figure 6A:
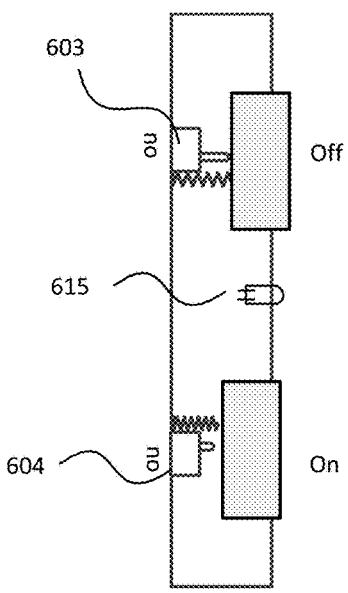
FIG. 6A is example of an electronic switch mechanism for use with embodiments of the invention.
Figure 6B:
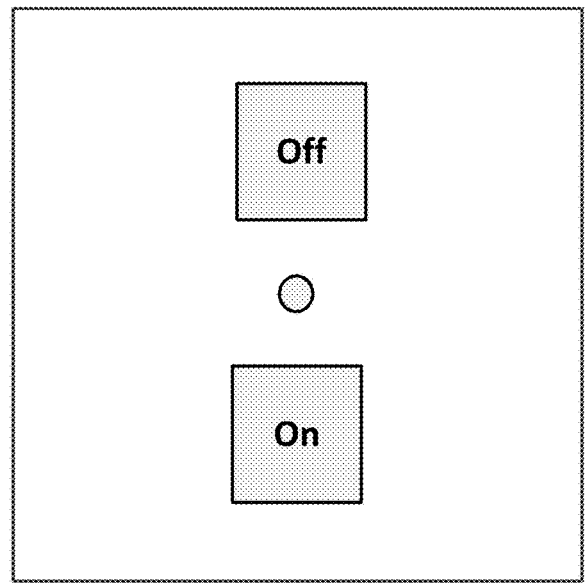
FIG. 6B is a top down view of the switch in FIG. 6A
Figure 6C:
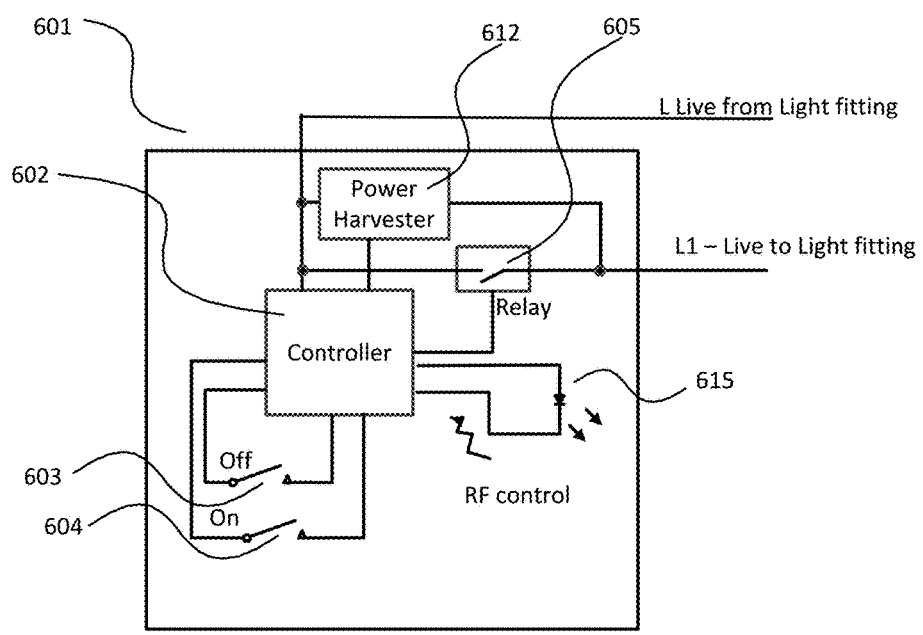
FIG. 6C is a schematic example of the light switch of FIG. 6A, wired for an alternative mains wiring configuration.

FIG. 6A shows an alternative type of switch which may use separate switches for on/off or up/down positions. The switches may be electromechanical buttons which require physical movement as in previous examples or they may be some form of touch sensitive interface. The same principle applies to provide an override state, be it mechanical or electrical, which may be visually indicated to the user and which prevents further control from any remote source. In normal operation the light is controlled by pressing of either button 603 or 604 individually. This may turn the light on or off or may also signal to brighten or dim the lamp. By pressing the buttons in some predetermined manner it is possible to trigger the override mode. This causes the controller 602 to disable relay 605 and ignore further remote commands. The controller may then provide some form of visual indication 615 which could be for instance an LED, indicator lamp, or screen display icon. The controller 602 will only respond to remote commands again after some further predetermined manner of button presses. The predetermined button presses may be a predetermined combination of single or multiple presses, including pressing two or more buttons together for a certain time, or pressing the off button for an extended period of time.

As a further example, the switch mechanism may be a rotary control type switch, of the sort that may be used with a dimmer. In this case a rotary encoder switch may be rotated by the user to provide dimming functionality and to turn the light on or off. The rotary encoder may be able to rotate endlessly in either direction so that it can easily be used to decrease or increase the brightness of the light. The rotary encoder may further include a push on/off switch which allows for the mechanical position of the switch to be pushed in or pulled out to enter an override state.

A two-way, or multi-way, switch application may be provided, which allows for a light to be controlled from two or more different physical locations. Such a two-way switch arrangement may be provided using any of the above described embodiments. A common problem with such switching arrangements is that when they are implemented with mechanical switches, there can be the same confusion over the positioning of the switch which may not always reflect whether the light is on or off. Embodiments can be extended such that switch actuated control of the light from one switch is independent of control from another, and both switches allow for the light to be disabled, whereby it cannot be switched on via remote or at the wall switches without the override being disabled first. For example, pressing either switch downwards may always turn the light on, pressing it upwards may always turn it off and it may always be possible to permanently disable the light from either switch.

Figure 7:
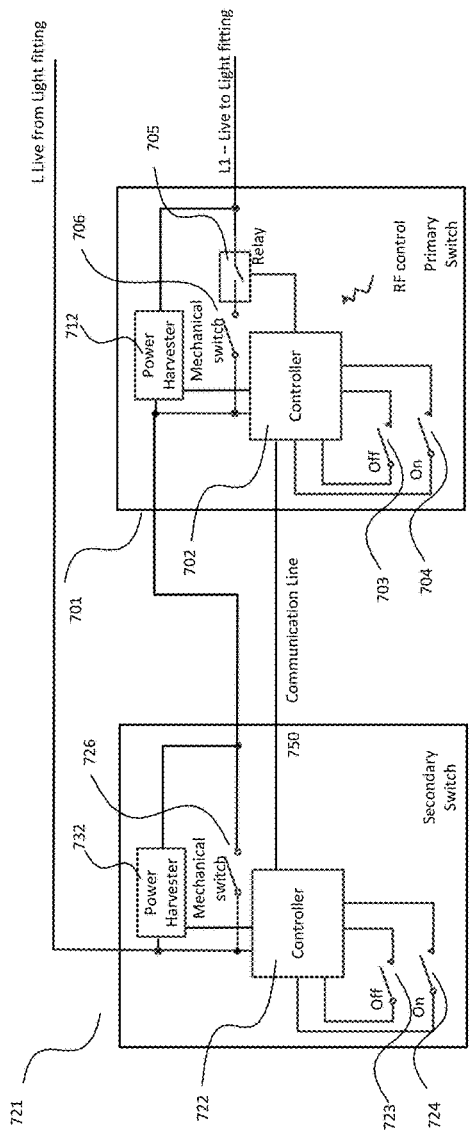
FIG. 7 is a schematic example of the light switch wired for use in multi-way switching applications.

FIG. 7 shows a system where both switches include a mechanical override switch. Each switch contains its own controller and, optionally, power harvesting circuitry. In addition, a communication line is provided to allow commands to be sent from the secondary controller 722 to the primary controller 702. The communication line allows the primary controller 702 to receive instructions given by the user at secondary controller 722 and operate the light accordingly. It is most common for conventional two way switches to be wired with 3 core wire between the switches. This same wire may be reused for the purposes of communicating between the two switches, although it is also possible to use a wireless communication arrangement such as RF communication. In either case, a communication output 750 is provided from the secondary switch to the controller of the primary switch. The two switches are remotely located from one another, in the sense that they are spaced apart within the same building and may be several meters apart.

The physical switch arrangements may take the form of any switches described herein. In this example, each switch includes a centre biased switch, which means the user can always control the light by pressing in a consistent direction, for example downwards for on or upwards for off. In addition both switches include a mechanical override switch 706, 726, which is engaged by pushing either switch into a fully off position, or in any of the other ways described herein. The lighting circuit can be safely isolated from either position since the live wire is common to both switches.

Figure 8:
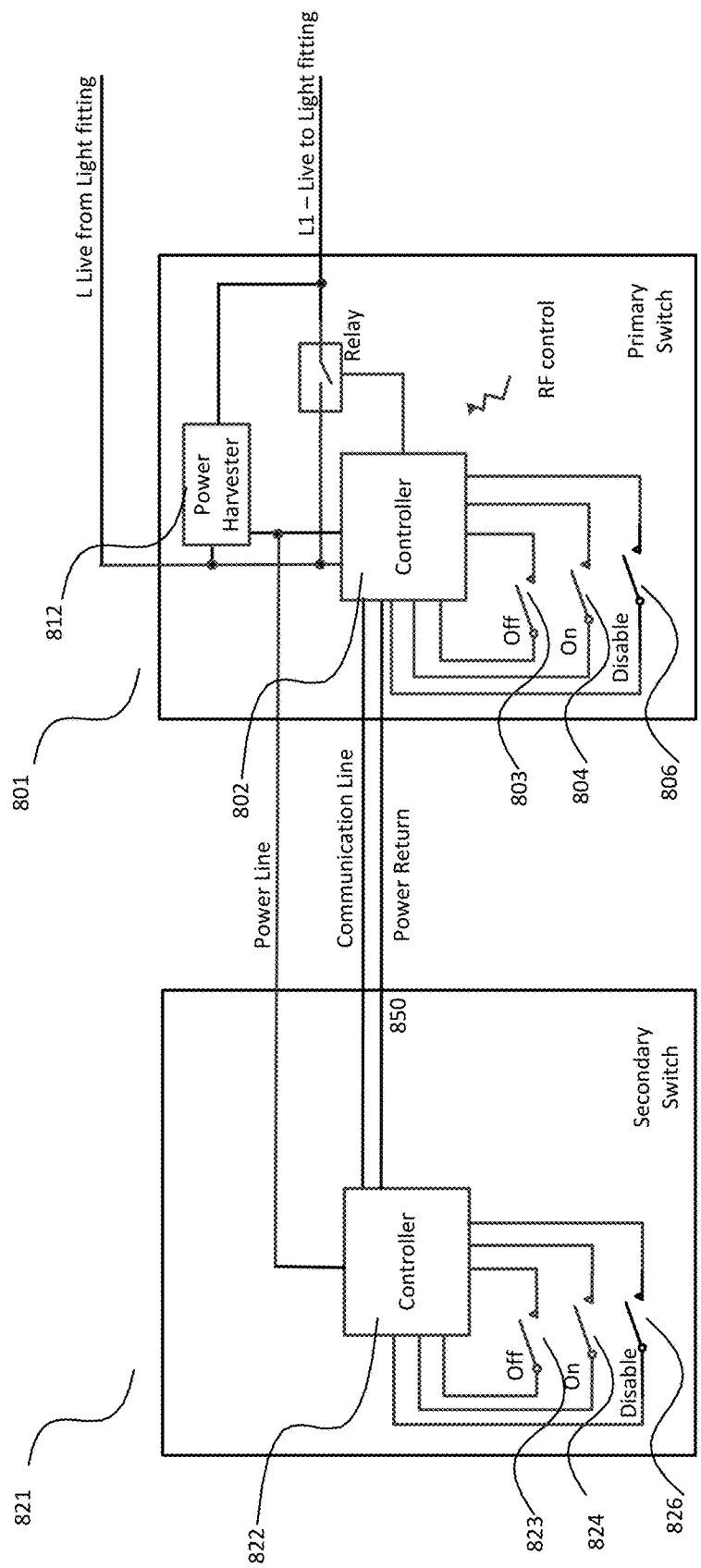
FIG. 8 is a schematic example of the light switch wired for use in multi-way switching applications with an alternative wiring configuration.

FIG. 8 shows an alternative arrangement, similar to that of FIG. 4A or 4B, in which the secondary switch does not contain an independent mechanical override, but is merely a slave to the primary controller. The secondary controller again may have a centre biased switch with an additional override switch position. The override position can be signalled either when the off button 803//823 is permanently engaged, or by a separate override button 806/826 as described above. Alternatively, any of the other above described switching mechanisms may be used. The secondary controller 822 communicates with the primary controller 802 in the same manner as described for FIG. 7, sending command signals relaying user instructions given at the secondary controller. The secondary controller of FIG. 8 also sends instructions to control the relay to prevent electrical power reaching the light.

The example of FIG. 8 also shows an alternate arrangement to that of FIG. 7 whereby the secondary switch is powered directly from the primary controller.

Either of the above examples can be extended with further units connected in the same manner, using the same control line to communicate with the main controller in a series fashion, or by using the primary controller as a hub to which a number of secondary switches are connected, or a combination of the two arrangements. Wireless communication between the controllers may also be used.

Figure 9:
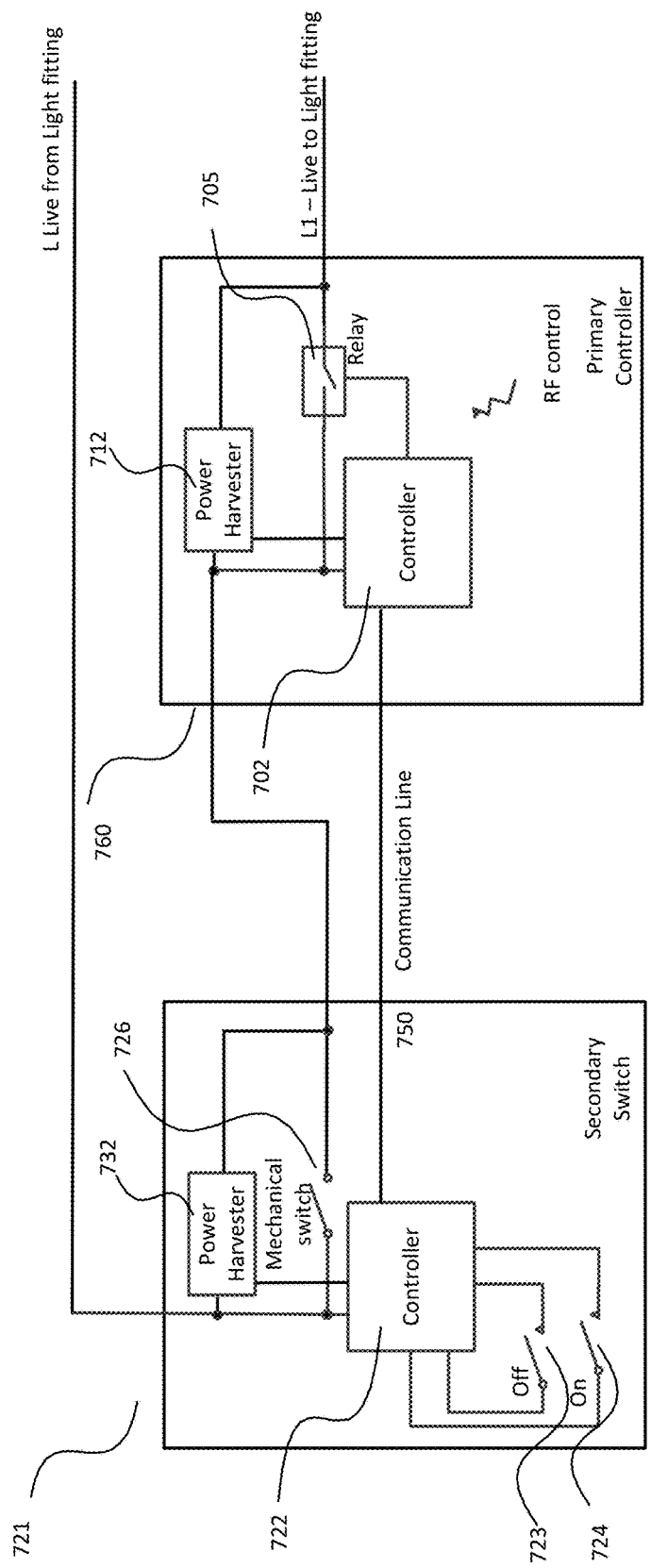
FIG. 9 is a schematic example of the light switch wired to a control unit.
Figure 10:
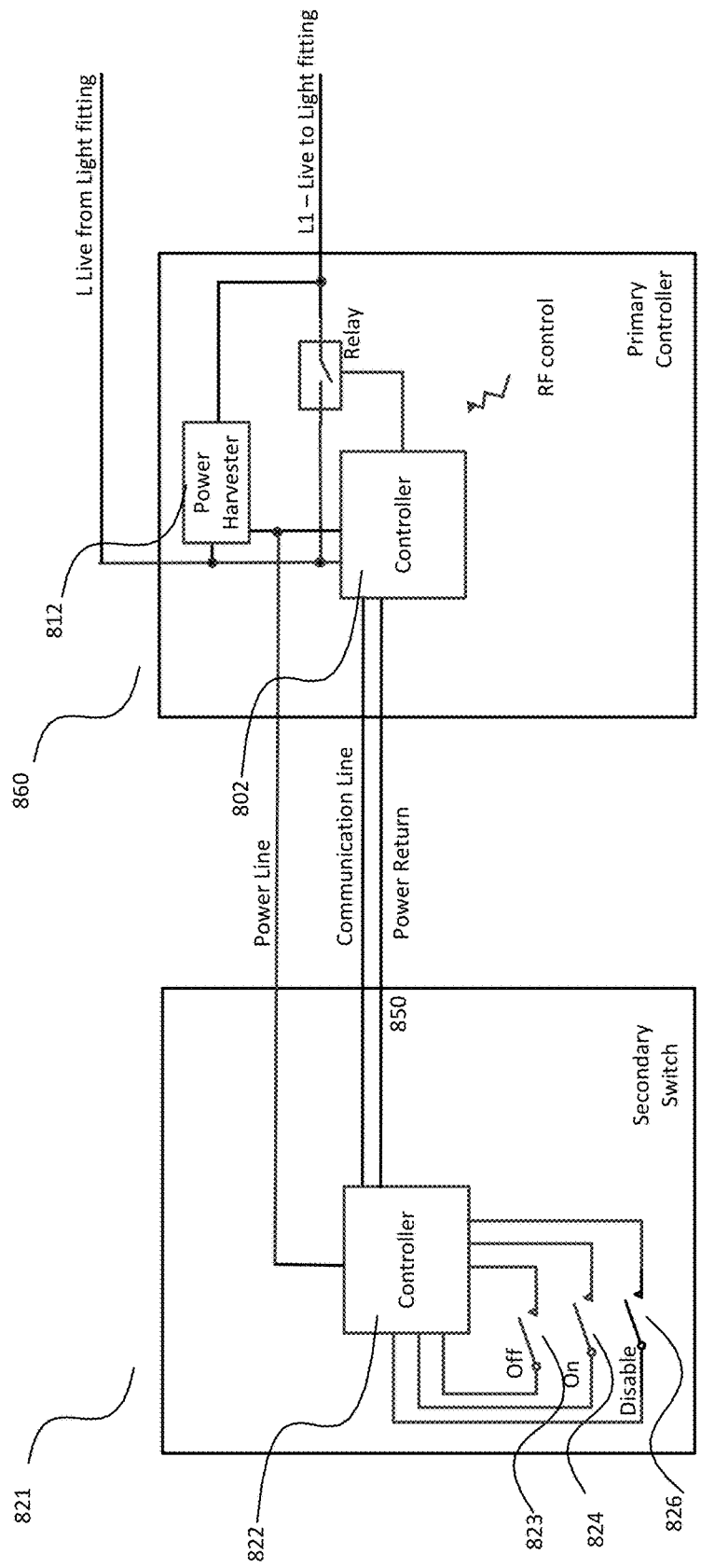
FIG. 10 is a schematic example of the light switch wired to a control unit with an alternative wiring configuration.

FIGS. 9 and 10 provide alternative examples to those of FIGS. 7 and 8 in which the primary switch is replaced with a control unit 760/860. The control unit is functionally the same as the primary switch, but does not include a user operable physical switch. As such, the control unit does not function as a light switch. Instead, the primary controller performs a control function based on input from wireless signals, and signals received from one or more secondary switches.

Any of the described embodiments may further comprise a wireless transmitter coupled to, or integrated with, one or more of the primary or secondary controllers 202/402/602/702/722/802/822. The processor may be configured to detect when the manual light switch is in the override position and, in response, to send a communication to one or more user devices, using the transmitter, to cause the user devices to display a message indicating that remote commands to the switch will not work. The communication may include the message to display to the user, or it may include a display trigger to the user device, which has the message pre-installed. Alternatively, the communication may include a link to a webpage that displays the message.

In any embodiments, additional controls beyond "on" and "off" may be provided either at the light switch or via remote control. For example a dimmer switch may be provided in place of, or in conjunction with, the relay 205/405. The controller may adjust the dimmer switch based upon input from the user, either via the physical switch unit or via remote control, e.g. to provide preset levels.

As mentioned above, whilst certain wiring configurations allow power to be supplied permanently to the light switch, it is becoming more common to use radial, loop in, wiring configurations in which only the live wire is passed through the light switch, meaning that it is not possible to constantly power the light switch components. For embodiments in which a constant source of power is not available to it, the light switch may include one or more of: a means of obtaining power from a single power line when the light is being powered; means of storing and maintaining power, such as one or more batteries, when the device is off; means of monitoring the current; and the ability to turn itself on and off.

Since it is necessary for the controller 202, 402, 602, 702, 722, 802, 822, to respond to user input even when the light source under control is switched off, it is necessary to maintain power in the light switch, particularly to the controller and to the wireless receiver if it is an active receiver. To that end, the light switch may include a power storage assembly 212, 412, 612, 712, 732, 812. The assembly may include a power harvesting circuit which would scavenge power from the lighting feed. When the light source under control is turned on and current is flowing to it, it is possible for the light switch to utilise the current flow, via the power charging source, to recharge its internal power storage.

The power storage assembly may include one or more battery cells, one or more capacitors, and/or similar charge storage devices. The capacity of the power storage may typically be such that, under normal operating conditions, the power storage can be adequately refreshed whenever the light is operational. The power storage may have sufficient capacity to power the controller and allow for wireless communications for long periods even when the light is switched off. Because of the differing usage of lights, different embodiments may be specified with different power storage capacities to cope with different recharging regimes. Various embodiments of device controllers may be optimised for constant switching on/off (e.g., daily usage, hourly usage, etc.) and/or for relatively long off periods (e.g., off periods which may last for a year or more).

The power charging source may be configured to tap into the flow of current to the light source being controlled. In some embodiments, the power charging source may cause a small amount of current to flow through a power generation circuit of the power charging source. In addition, or in the alternative, the power charging source may take the whole current through a transformer circuit of the power charging source.

Due to possible variability of the load current to the light, the power charging source may contain one or more sensing elements and one or more switchable elements so that, for instance, with a small load, more current is passed through the power storage circuit to charge the power storage cell. Thus, as the load increases, a smaller proportion may be tapped.

In the case when the light is switched off, the controller may turn on the light momentarily for periods that are sufficiently short that the light source is not activated, or is not fully activated, to allow the power storage to charge. In some embodiments, this method may be enhanced or replaced by switching a secondary current switch that allows only a small current to flow. The current is sufficiently small to charge the power storage without activating the light. In this case, the power charging source may be automatically reconfigured to operate from the lower current. In addition, or in the alternative, in various embodiments, the low current may allow the device controller to monitor the timing of the AC mains cycle and to switch the primary current switch on in synchronization. This has the advantage of minimising RFI interference, particularly when dimming and also provides least stress to components.

The light switch may include a power detector configured to monitor the voltage being stored. The power detector may detect when the voltage starts to drop so that it is possible to perform a background recharging of the power storage. The power detector may be communicably coupled with the controller 202, 402, 602, 702, 722, 802, 822. The controller may also send a message to a user device when the power storage is getting low and/or critically low so that the user may be informed.

Embodiments have been described that rely on input from a remote control. The remote control unit used to send remote control signals to control the light source may be a dedicated remote control device, or may be any appropriate user device that is able to send an appropriate wireless signal, such as a mobile phone, tablet, personal computer, smart watch or similar, programmed to output appropriate command signals.

The light source controlled by the light switches described herein may be any appropriate source of light used in home or office environments, such as light bulbs, including incandescent bulbs, LED light bulbs, fluorescent lights and so on. Each light switch may control one or more light sources, such as one or more light bulbs. Multiple switching mechanisms may be provided in a single light switch unit, referred to as multiple gangs. Separate controllers may be used for each user operated switch, or a common controller may be used.

Earth wires have not been shown in the figures, but may be included as appropriate.

A switch may be provided according to a third aspect of the invention with features according to the following clauses:

1. A switch for use in a light switch according to any embodiment described herein, comprising an actuator having at least a first activation position, a second activation position and an override position, the switch further comprising a detent mechanism that holds the actuator in the override position until an external force is applied to the actuator.

2. A switch according to clause 1 wherein the actuator is biased to a first biased position and the override position is engaged by applying a force to the actuator against the bias until the detent mechanism engages.

3. A switch according to clause 2 wherein the actuator is moveable between the first biased position and the first activation position by applying a force against the bias, said force being less than the force required to engage the detent mechanism, the actuator moving back to the first biased position from the first activation position when the force is removed, wherein, in use, when the actuator is placed in the first activation position, a signal is sent to control a light source.

4. A switch according to clause 2 or 3 wherein the actuator is moveable between the first biased position and a second activation position by applying a force against the bias, the actuator moving back to the first biased position from the second activation position when the force is removed, wherein, in use, when the actuator is placed in the second activation position, a signal is sent to the processor to control a light source.

5. A switch according to clause 3 or 4 wherein in use the switch, when the actuator is in the first activation position, sends a signal to control the light source to turn on, and when the actuator is in the second activation position sends a signal to control the light source to turn off.

What is claimed is:

1. A light switch comprising:
a user input mechanism;
a wireless receiver for receiving remote control signals; and
a processor coupled to the user input mechanism and to the wireless receiver and configured to control a light source both in response to activation of the user input mechanism and in response to the remote control signals;

wherein the light switch is configured to, in response to a user override input via the user input mechanism, enter an override state, whereby the light source is maintained in an off state and remote control signals are prevented from causing the light source to be switched on, until the override state is disengaged;

the light switch includes a visual indicator that visually distinguishes when the light switch is in the override state corresponding to an actuator of the light switch maintained in an override position, from when the light switch is in an off state corresponding to the actuator in an inactive position and from when the light switch is in an on state corresponding to the actuator in an activation position; and wherein the override state is different from the off state, and the override position is different from the inactive position.

2. The light switch according to claim 1, wherein the user input mechanism is a manual switch having an actuator with an override position, the light switch further comprising a detent mechanism that holds the actuator in the override position until an external force is applied to the actuator.

3. The light switch according to claim 2, wherein the actuator is configured with a bias to a first biased position and the override position is engaged by applying a force to the actuator against the bias until the detent mechanism engages.

4. The light switch according to claim 3, wherein:

the actuator is moveable between the first biased position and a first activation position by applying a force against the bias, said force being less than the force required to engage the detent mechanism, the actuator moving back to the first biased position from the first activation position when the force is removed, and the light switch, when the actuator is placed in the first activation position, sending a signal to the processor to control the light source;

wherein the actuator is moveable between the first biased position and a second activation position by applying a force against the bias, the actuator moving back to the first biased position from the second activation position when the force is removed, the light switch, when the actuator is placed in the second activation position, sending a signal to the processor to control the light source; and wherein the light switch, in the first activation position, sends a signal to the processor to control the light source to turn on, and in the second activation position sends a signal to the processor to control the light source to turn off.

5. The light switch according to claim 1, wherein the actuator is configured to have an override position that opens a mechanical switch to prevent electrical power reaching the light source.

6. The light switch according to claim 1, wherein the user input mechanism is an electromechanical or touch sensitive mechanism.

7. The light switch according to claim 1, wherein the processor is configured to receive the user override input via the user input mechanism and, in response, to maintain the light source in an off state and prevent remote control signals from causing the light source to be switched on.

8. The light switch according to claim 1, wherein the visual indicator is one or more of a light emitter or a physical switch position of the user input mechanism.

9. The light switch according to claim 1, further comprising a wireless transmitter coupled to the processor, wherein the processor is configured, when the override state is entered, to send a communication to a user device, using the wireless transmitter, to cause the user device to display a message indicating that remote commands to the light switch will not work.

10. The light switch according to claim 1, further comprising a power storage assembly configured to utilize current flow to the light source to recharge a power storage.

11. A light switch comprising:

a user input device;

a communication output; and a processor coupled to the user input device and to the communication output, the processor being configured to receive input from a user by activation of a user input mechanism, and to send data indicative of the input from the user to a remotely located controller that controls a light source both in response to activation of the user input mechanism and in response to remote control signals received via a wireless receiver;

wherein the light switch is configured, in response to user input via the user input mechanism, to trigger an override state, whereby the light source is maintained in an off state and remote control signals are prevented from causing the light source to be switched on, until the override state is disengaged;

the light switch includes a visual indicator that visually distinguishes to a user when the light switch is in the override state corresponding to an actuator of the light switch maintained in an override position, from when the light switch is in an off state corresponding to the actuator in an inactive position and from when the light switch is in an on state corresponding to the actuator in an activation position; and wherein the override state is different from the off state, and the override position is different from the inactive position.

12. The light switch according to claim 11, further comprising a relay switch coupled to a live wire of the light source, wherein the override state is triggered by actuating the relay switch, via the processor or directly by the user input mechanism, to prevent electrical power reaching the light source.

13. The light switch according to claim 11, wherein the override state is triggered by the processor sending an override signal to the remotely located controller indicating that an override state has been selected by the user, the remotely located controller being configured, in response to receiving the override signal, to maintain the light source in an off state and prevent remote control signals from causing the light source to be switched on.

14. The light switch according to claim 11, wherein the user input mechanism is a manual switch having an actuator with an override position, the light switch further comprising a detent mechanism that holds the actuator in the override position until an external force is applied to the actuator.

15. A method for controlling a light switch, the method comprising:

controlling a light source both in response to activation of a user input mechanism and in response to remote control signals;

in response to receiving a user override input via the user input mechanism, entering an override state, such that the light source is maintained in an off state and remote control signals are prevented from causing the light source to be switched on, until the override state is disengaged; and visually distinguishing, by a visual indicator of the light source, to a user when the light switch is in the override state corresponding to an actuator of the light switch maintained in an override position, from when the light switch is in an off state corresponding to the actuator in an inactive position and from when the light switch is in an on state corresponding to the actuator in an activation position; and wherein the override state is different from the off state, and the override position is different from the inactive position.

16. The method according to claim 15, wherein the override position opens a mechanical switch to prevent electrical power reaching the light source.

17. The method according to claim 15, wherein the user input mechanism is an electromechanical or touch sensitive mechanism.

18. The method according to claim 15, further comprising:
receiving the user override input via the user input mechanism; and
in response, maintaining the light source in an off state and prevent remote control signals from causing the light source to be switched on.

19. The method according to claim 15, further comprising:
when the override state is entered, sending a communication to a user device; and
using a wireless transmitter, causing the user device to display a message indicating that remote commands to the light switch will not work.

20. The method according to claim 15, further comprising utilizing current flow to the light source to recharge a power storage.

* * * * *